US012706407B2

(12) United States Patent
Hanks et al.

(10) Patent No.: US 12,706,407 B2
(45) Date of Patent: Aug. 11, 2026

(54) SHIELDED SOCKET PIN FOR DEVICE-TO-DEVICE CONNECTION

(71) Applicant: Intel Corporation, Santa Clara, CA (US)

(72) Inventors: Landon Hanks, Milwaukie, OR (US); Xiang Li, Portland, OR (US); George Vergis, Portland, OR (US); James A. McCall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 17/737,243

(22) Filed: May 5, 2022

(65) Prior Publication Data

US 2022/0263262 A1 Aug. 18, 2022

(51) Int. Cl.

| | |
|---|---|
| ***H01R 12/00*** | (2006.01) |
| ***H01R 12/71*** | (2011.01) |
| ***H01R 13/04*** | (2006.01) |
| ***H01R 13/24*** | (2006.01) |
| ***H01R 13/652*** | (2006.01) |
| *H01R 12/70* | (2011.01) |

(52) U.S. Cl.

CPC ....... *H01R 13/2442* (2013.01); *H01R 12/714* (2013.01); *H01R 13/04* (2013.01); *H01R 13/2485* (2013.01); *H01R 13/652* (2013.01); *H01R 12/7076* (2013.01)

(58) Field of Classification Search

CPC .. H01R 13/2442; H01R 12/714; H01R 13/04; H01R 13/2485; H01R 13/652; H01R 12/7076; H01R 12/57; H01R 13/6461; H05K 7/1069

See application file for complete search history.

(56) References Cited

U.S. PATENT DOCUMENTS

| | | | | |
|---|---|---|---|---|
| 7,909,621 | B1 * | 3/2011 | Terhune, IV | H01R 12/57 439/83 |
| 8,851,904 | B2 * | 10/2014 | Chang | H05K 7/1069 439/71 |
| 9,106,022 | B2 * | 8/2015 | Cai | H01R 13/6471 |
| 10,403,992 | B1 * | 9/2019 | Mason | H01R 13/2442 |

(Continued)

OTHER PUBLICATIONS

Kan, Michael and Sexton, Michael Justin Allen, "Reminder: DDR4 RAM Won't Fit Into DDR5 Slots and Vice Versa", PCMag, https://www.pcmag.com/news/reminder-ddr4-ram-wont-fit-into-ddr5-slots-and-vice-versa, Oct. 15, 2021, 9 pages.

(Continued)

*Primary Examiner* — Abdullah A Riyami
*Assistant Examiner* — Nelson R. Burgos-Guntin
(74) *Attorney, Agent, or Firm* — Compass IP Law PC

(57) ABSTRACT

Examples described herein relate to a system that includes: a first signal pin and a first ground pin adjacent to the first signal pin. In some examples, the first signal pin comprises a first portion, a second portion, and a third portion. In some examples, the first ground pin comprises a first portion, a second portion, and a third portion, the second portion of the first signal pin comprises a vertical mount, the second portion of the first ground pin comprises a vertical mount, and the second portion of the first signal pin and the second portion of the first ground pin are arranged proximate one another.

17 Claims, 13 Drawing Sheets

(56) References Cited

U.S. PATENT DOCUMENTS

| | | | | |
|---|---|---|---|---|
| 2005/0064739 | A1* | 3/2005 | Searls | H01R 12/52 439/66 |
| 2006/0148283 | A1* | 7/2006 | Minich | H05K 7/1069 439/70 |
| 2006/0292935 | A1* | 12/2006 | Ma | H01R 13/2442 439/752.5 |
| 2010/0167559 | A1* | 7/2010 | Cavegn | H05K 7/1069 439/65 |
| 2013/0105984 | A1* | 5/2013 | Rathburn | H05K 3/32 257/773 |
| 2015/0359122 | A1* | 12/2015 | Masuda | H05K 7/1069 439/68 |
| 2019/0089098 | A1* | 3/2019 | Cheng | H01R 13/2442 |
| 2021/0305196 | A1* | 9/2021 | Jensen | H01R 13/2421 |
| 2022/0029326 | A1* | 1/2022 | O'Connell | H01R 12/714 |

OTHER PUBLICATIONS

Smith, Ryan, "DDR5 Memory Specification Released: Setting the Stage for DDR5-6400 and Beyond", AnandTech, https://www.anandtech.com/show/15912/ddr5-specification-released-setting-the-stage-for-ddr56400-and-beyond, Jul. 14, 2020, 8 pages.

* cited by examiner

SHIELDED SOCKET PIN FOR DEVICE-TO-DEVICE CONNECTION

BACKGROUND

Central processing unit (CPU) packages include packaged processor technology with connections for communication with a motherboard. FIG. 1 shows an example of a side view of pins of a CPU socket coupled to ball grid array (BGA) and the BGA is coupled to at least one solder mount pad of a motherboard. CPU package 100 can be coupled to BGA of motherboard 104 using signal and ground pins 102.

FIG. 2A depicts a top, exposed view, of a socket pin landing pad arrangement of a CPU package for connection with pins. FIG. 2B depicts a lower, exposed view of socket pin BGA solder mount pads of a motherboard for connection with pins. The BGA of the motherboard can be connected to devices such as memory devices through the motherboard. For example, dual inline memory module (DIMM) gold fingers (GF) can be connected to corresponding surface-mount technology (SMT) pads of the motherboard using signal and ground pins.

BRIEF DESCRIPTION OF THE DRAWINGS

FIGS. 4A-1 to 4A-6 show examples of a ground pin and signal pin arrangements and designs.

FIG. 5 shows an example of far end cross talk (FEXT) reduction using various embodiments.

FIG. 6 depicts an example process.

DETAILED DESCRIPTION

Signals transmitted using different signal pins can experience cross talk whereby signals transmitted on one signal pin can cause interference to signals transmitted on one or more other signal pins. In some cases, crosstalk can be caused by capacitive, inductive, or conductive coupling. In some cases, as in the examples of FIGS. 1 and 2A-2B, a ground pin may not provide sufficient protection against cross talk between signals transmitted using two or more adjacent signal pins and signal interference may reach undesired levels.

Various embodiments provide a pin shape to provide at least a partial shield from cross talk. A portion of a retention post or cantilever mount segment of a first pin can be positioned to be adjacent to a portion of a retention post or cantilever mount segment of a second pin. Where the first pin is a signal pin, the second pin can be a ground pin. Where the first pin is a ground pin, the second pin can be a signal pin. The portion of a retention post or cantilever mount segment can be shaped to be flat or rounded. Various embodiments provide potentially improved signal-to-noise ratio.

In some cases, signal and ground pin arrangements (e.g., locations of signal and ground pins) for CPU packages and motherboards can be prescribed to provide interoperability between CPU packages and motherboards of different vendors. Various embodiments can utilize existing signal and ground pin arrangements and potentially improve signal-to-noise ratios.

Figure 3A:
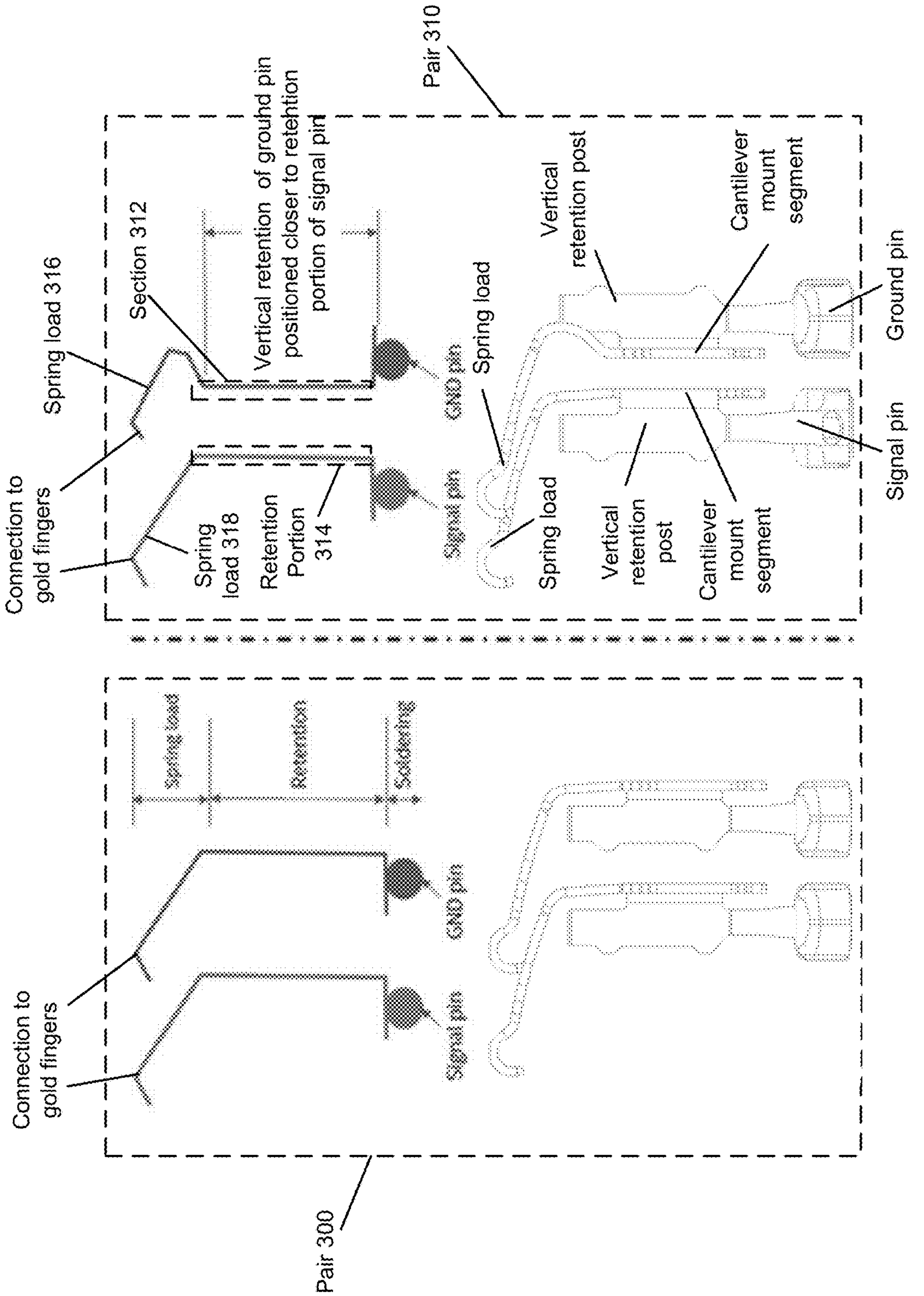
FIG. 3A depicts an example of a ground and signal pin shapes.

FIG. 3A depicts an example of a ground and signal pin shapes. Pair 300 depicts a known shape and arrangement of signal and ground pins. Signal pin can include a spring load, retention, and soldering portions. Likewise, ground pin can include spring load, retention, and soldering portions. Spring loads of signal and ground pins can be connected to CPU package landing pads. Retention portion can provide rigidity and structural support to signal and ground pins. Soldering portion of signal pin can connect retention of signal pin to a ball of a BGA. Soldering portion of ground pin can connect retention of ground pin to a ball of a BGA. In some examples, signal pins convey DQ (data) for communications with one or more memory devices.

Pair 310 include a shape arrangement of a signal pin and ground pin in accordance with various embodiments. A signal pin can include spring load, retention, and soldering portions. A ground pin can include spring load, retention, and soldering portions. In some examples, section 312 of retention portion of ground (GND) pin to be closer to retention portion 314 of signal pin. In other examples described herein, retention portion of signal pin can be shaped to be closer to retention portion of ground pin. Positioning of section 312 of retention portion of ground pin closer to retention portion 314 of ground pin can increase signal to noise ratio and reduce far end cross talk (FEXT) among signal pins. Spring load 316 of ground pin can be shorter than that of spring load 318 of signal pin and angled to achieve a contact point with a gold finger of an SMT.

Various embodiments of signal pin and ground pin can be manufactured by stamping and forming a metal such as, but not limited to, one or more of: copper, bronze, alloy (e.g., a combination of two or more metals), or any electrical or optical signal conductor. Blanked pin manufacturing can control the ground pin thickness to ensure the interface to SMT and GF are within the specified locations. In some examples, a thickness of a cross section of a ground pin leg can be approximately 0.1 mm, although other thicknesses can be used.

Thickness of section 312 of ground pin can be 0.15 to 0.2 mm. Thickness of retention portion 314 of signal pin can be 0.15 to 0.2 mm. Signal pins and ground pins can have cross section that is circular, oval, rectangular, square, triangular, elliptical, or a combination thereof. Spring load 316 and 318 can be straight, semi-circle, an arc, or other shapes. Retention portion 314 can extend to contact a ball of a ball grid array (BGA). Portions of retention portion 314 can be hollow or solid in some examples. Section 312 can extend to contact a ball of a BGA. Portions of section 312 can be hollow or solid in some examples.

Figure 3B:
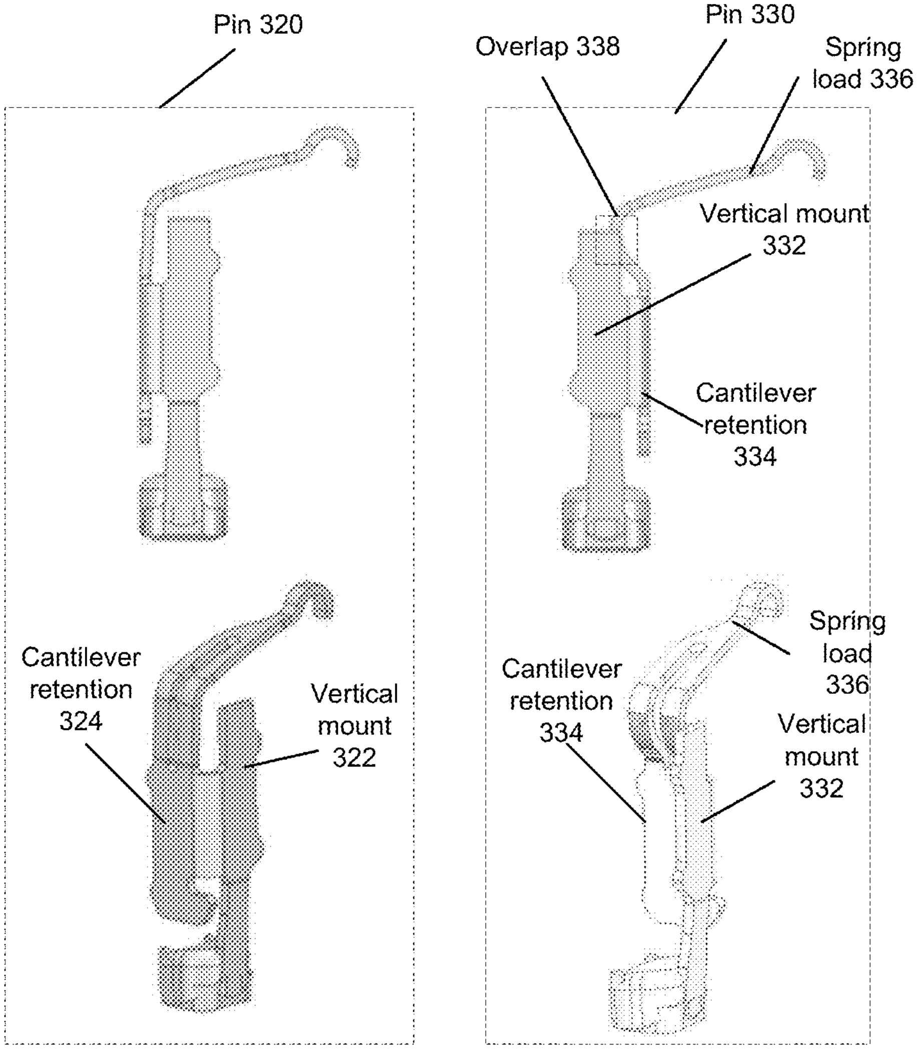
FIG. 3B depicts an example of a pin shape.

FIG. 3B depicts an example of pin shapes. Pin 320 depicts a known pin shape that can be used for ground or signal pins. Pin 330 depicts a pin shape, in accordance with various embodiments, whereby vertical mount 332 is positioned nearer to cantilever retention 334 than vertical mount 322 is positioned relative to cantilever retention 324 to provide overlap 338. Overlap 338 depicts a portion of vertical mount 332 that covers or shields a portion of spring load 336. As described herein, vertical mount 332 can be positioned adjacent to a similar vertical mount of another pin to provide shielding and reduce cross talk. Pin 330 can be used as a ground or signal pin. Portions of vertical mount 332 can be hollow or solid in some examples. In some examples, vertical mount 332 can include a rectangle-shaped surface, an oval-shaped surface, or a circular-shaped surface. A distance from vertical mount 332 to cantilever retention 334 can be approximately 80 mm, or other distances, in some examples.

Figure 1:
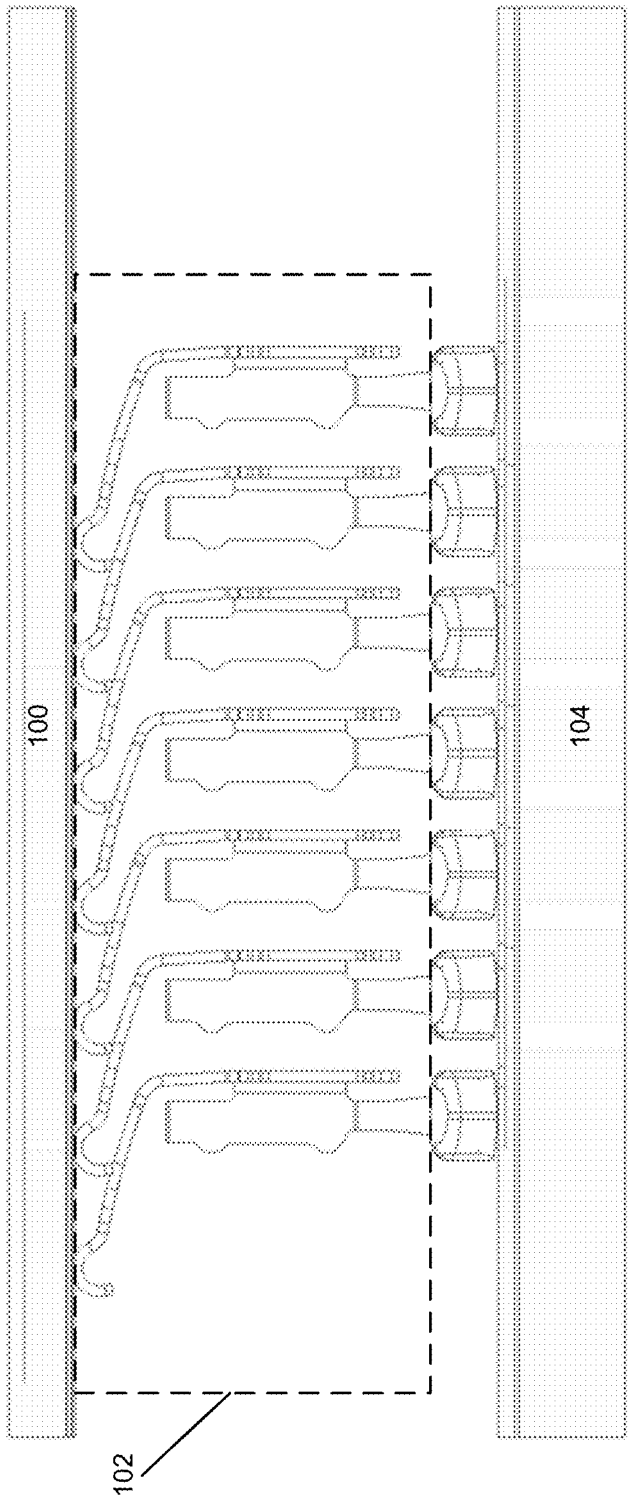
FIG. 1 shows an example of a side view of pins of a CPU package coupled through socket pin to ball grid array (BGA) of a motherboard.
Figure 2B:
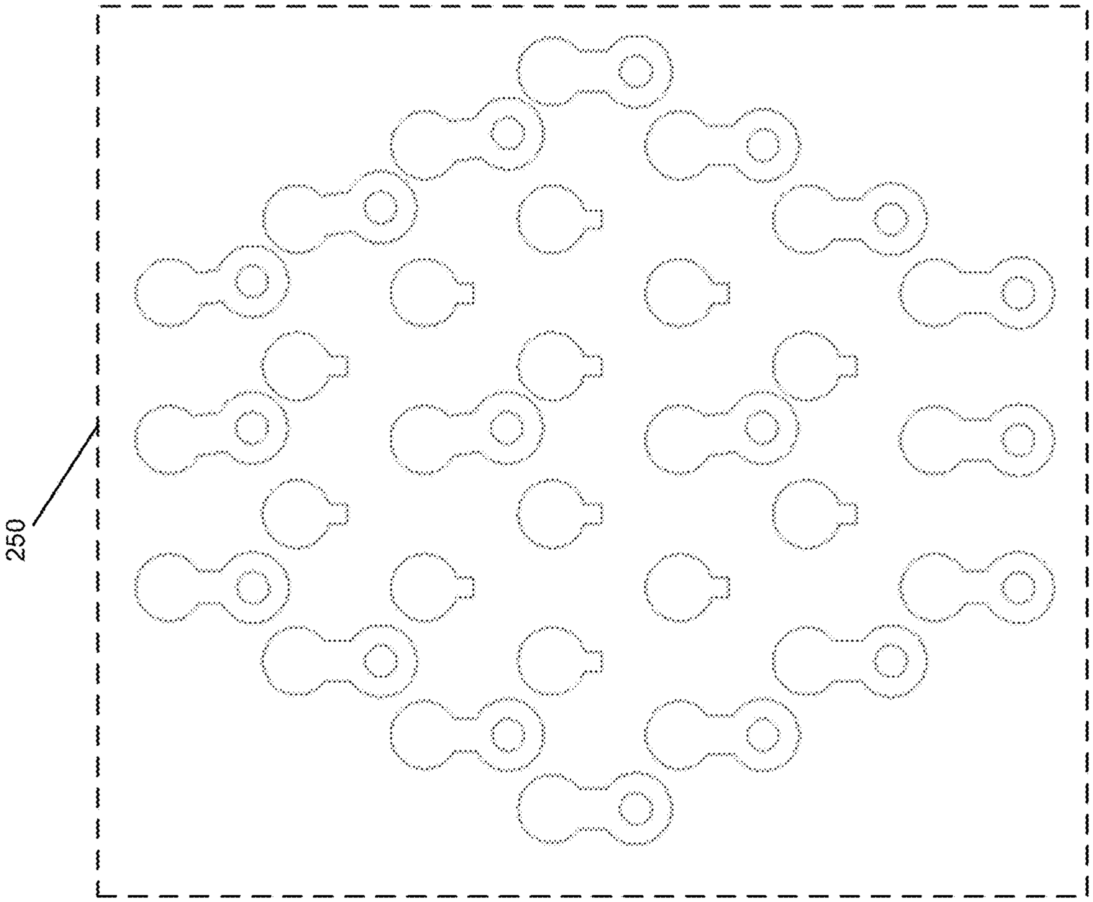
FIG. 2B depicts a lower, exposed view of socket pin BGA solder mount pads of a motherboard for connection with pins.
Figure 2A:
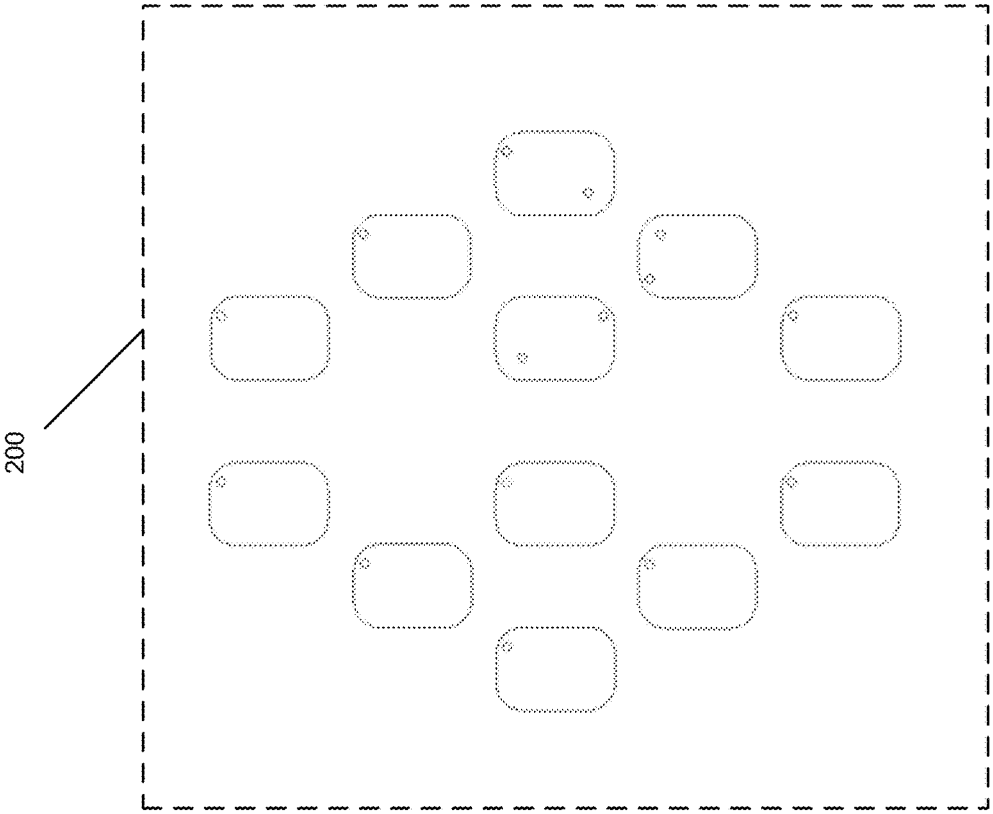
FIG. 2A depicts a top, exposed view, of a socket pin landing pad arrangement of a CPU package for connection with pins.
Figures 1, 4A:
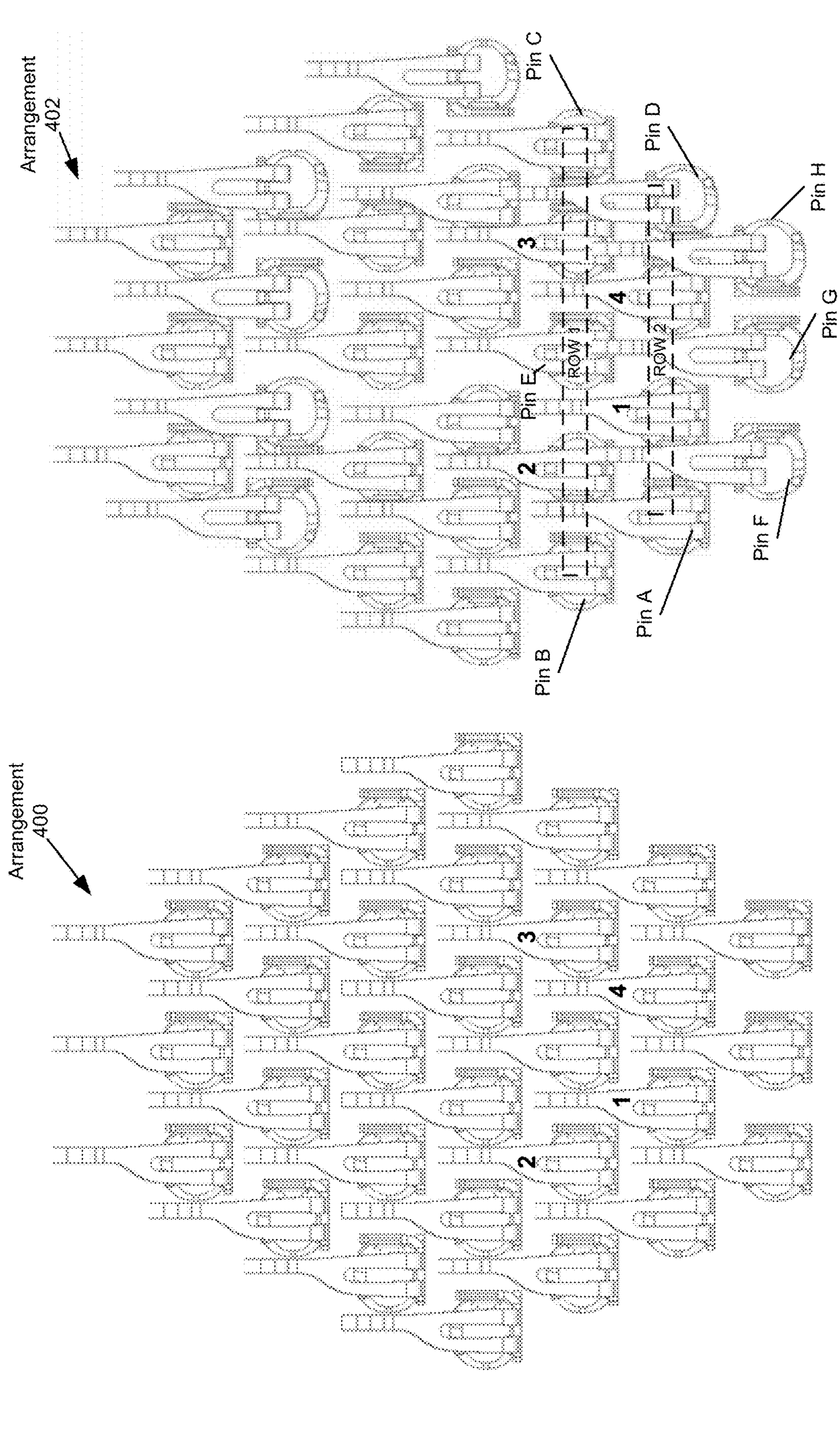

FIG. 4A-1 depicts a top down view of bow tie pin arrangements. Arrangement 400 is a known arrangement of pins. Arrangement 402 depicts an arrangement of signal and ground pins with vertical mounts positioned adjacent to one another for some pins that are in a same row or in a line, as described herein. In particular, signal pins 1-4 among ground pins are highlighted to show arrangements of vertical mounts of signal pins adjacent to vertical mounts of ground pins. A pair of row adjacent signal pin and ground pin can have portions of vertical mounts arranged to be proximate to one another. For example, a vertical mount of a signal pin can be proximate to a vertical mount of a ground pin by the vertical mount of the signal pin mirroring the vertical mount of a ground pin and the signal pin and the ground pin are arranged in a same row.

For example, signal pin 1 and ground pin A are in a same row (row 2) and signal pin 1 includes a vertical mount that is proximate to a vertical mount of ground pin A. Signal pin 4 and ground pin D are in a same row (row 2) and signal pin 4 includes a vertical mount that is proximate to a vertical mount of ground pin D. For example, signal pin 2 and ground pin B are in a same row (row 1) and signal pin 2 includes a vertical mount that is proximate to a vertical mount of ground pin B. Signal pin 3 and ground pin C are in a same row (row 1) and signal pin 3 includes a vertical mount that is proximate to a vertical mount of ground pin C.

Figures 2, 4A:
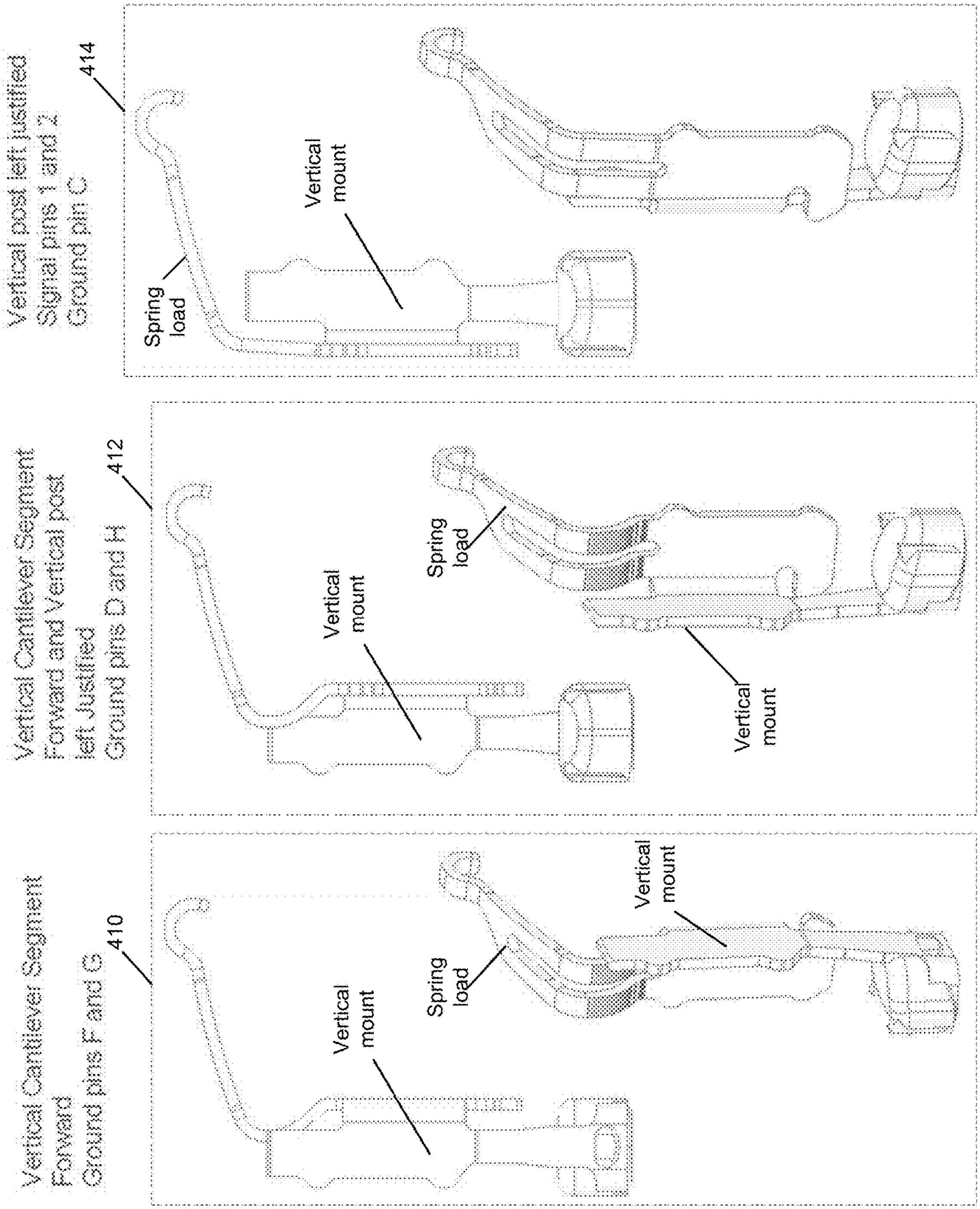

FIG. 4A-2 depicts an example of pin shapes of various pins. Configurations 410, 412, and 414 can include a vertical mount that extends to overlap with a portion of spring load. For example, ground pins F and G can be shaped as shown in configuration 410; ground pins D and H can be shaped as shown in configuration 412; and signal pins 1 and 2 and ground pin C can be shaped as shown in configuration 414.

Figures 3, 4A:
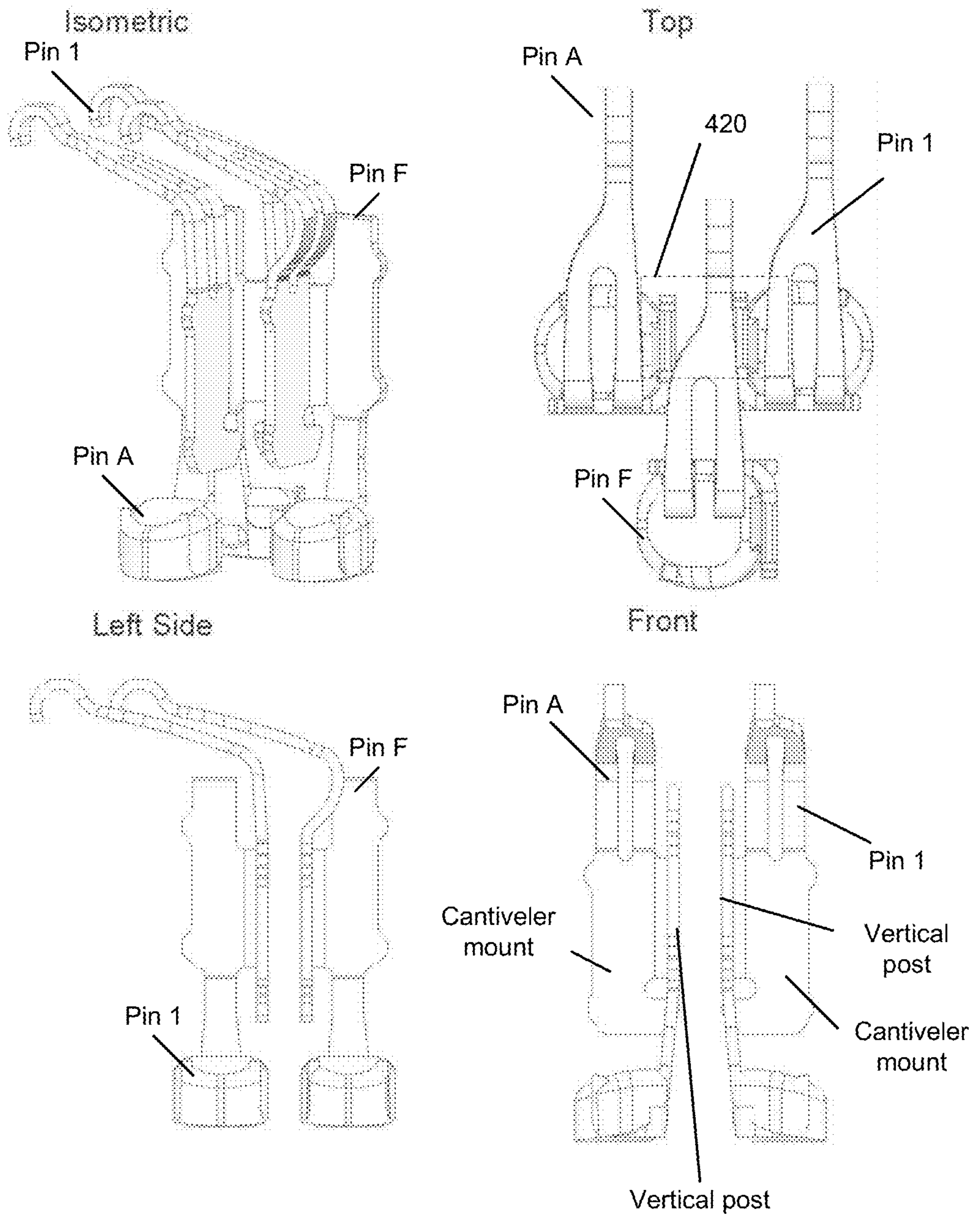
Figures 4, 4A:
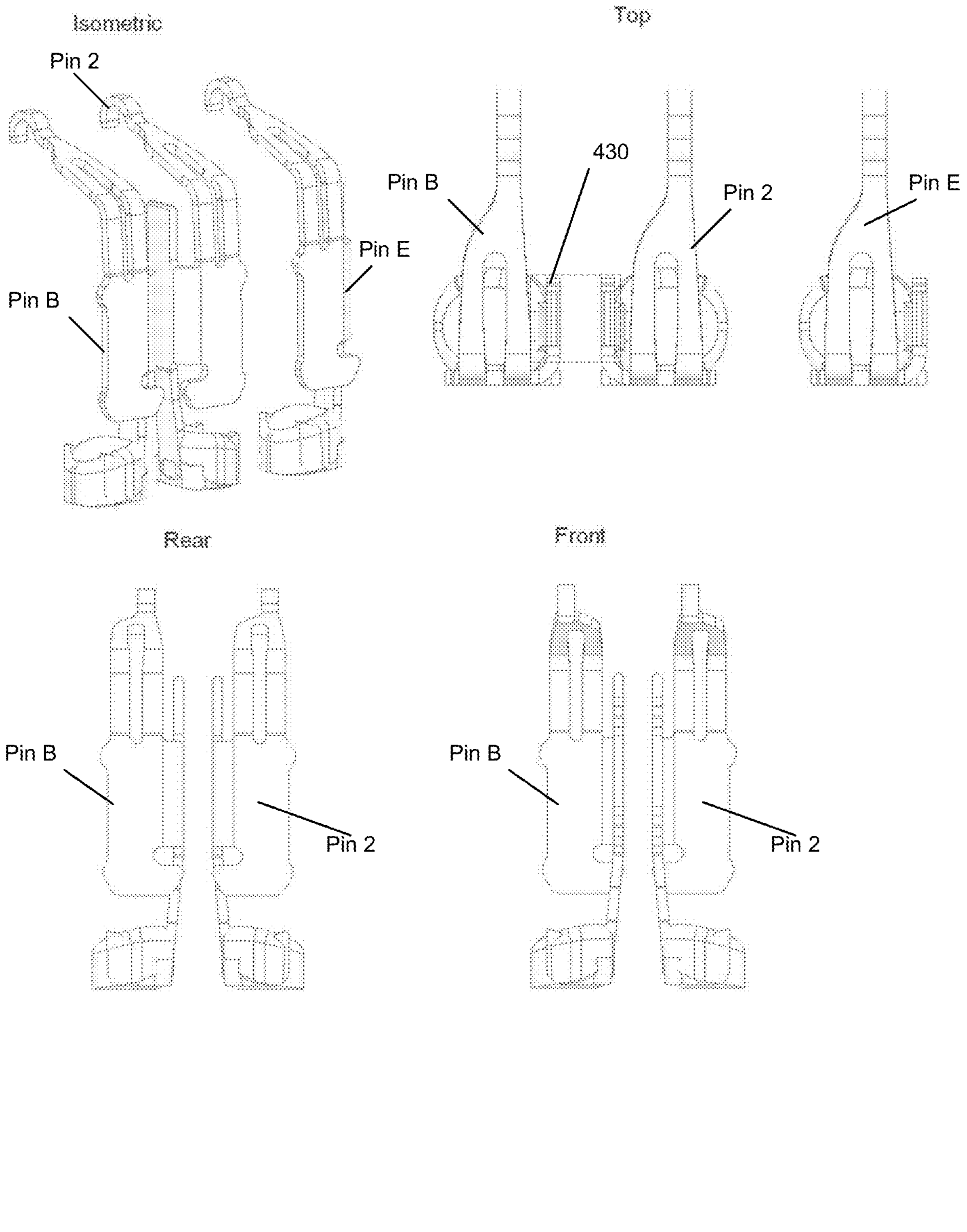
Figures 4, 4A, 5:
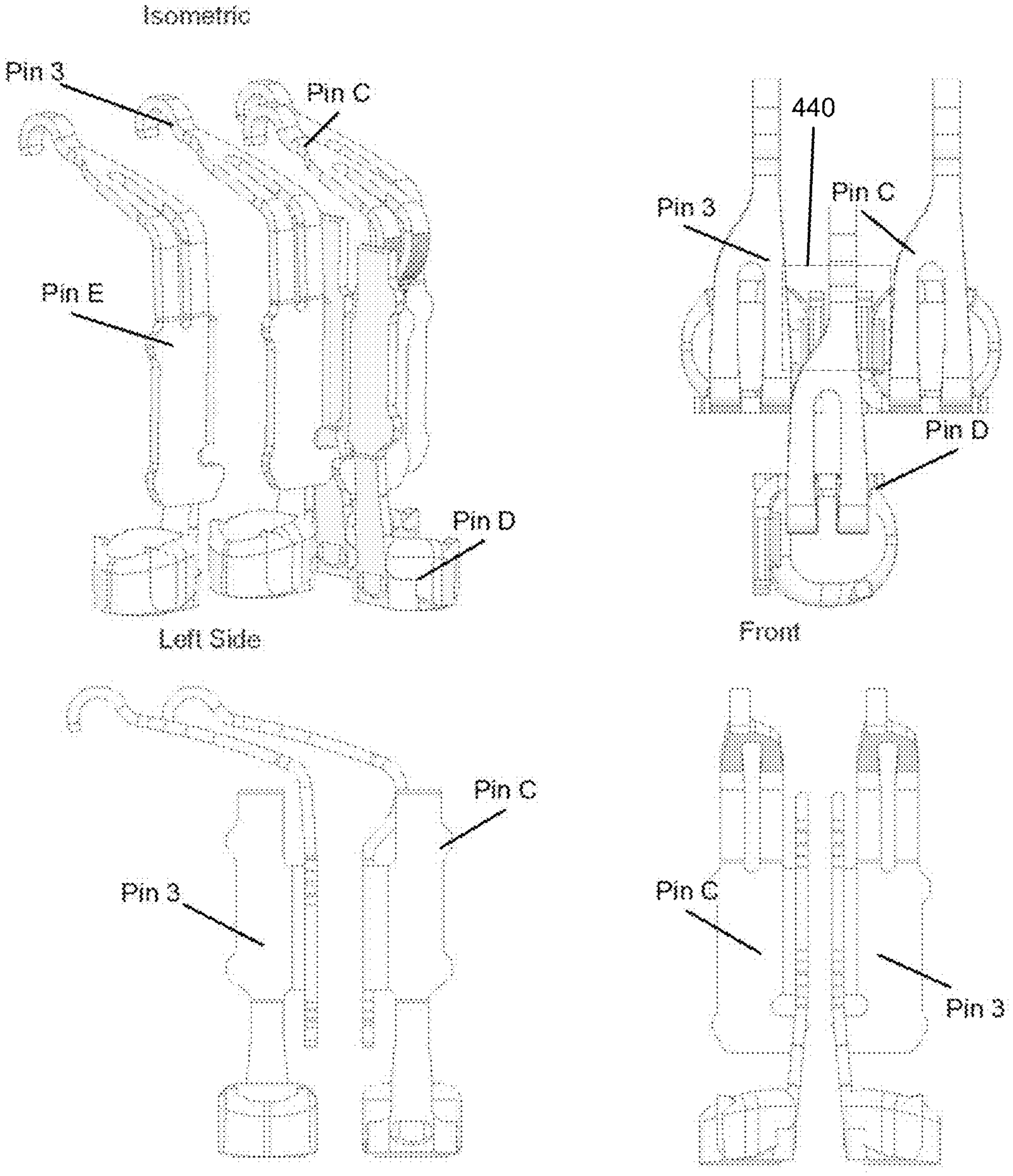

FIGS. 4A-3 to 4A-6 depict examples of configurations of respective signal pins 1-4 of FIG. 4A-1. FIG. 4A-3 depicts an example of an arrangement of signal pin 1 among ground pins A and F with vertical posts or mounts proximate (e.g., mirroring and adjacent) in 420. FIG. 4A-4 depicts an example of an arrangement of signal pin 2 among ground pins B and E with vertical posts or mounts proximate (e.g., mirroring and adjacent) in 430. FIG. 4A-5 depicts an example of an arrangement of signal pin 3 among ground pins C-E with vertical posts or mounts of pins 3 and C proximate (e.g., mirroring and adjacent) in 440. FIG. 4A-6 depicts an example of an arrangement of signal pin 1 among ground pins D and H with vertical posts or mounts of pins 4 and D proximate (e.g., mirroring and adjacent) in 450.

FIG. 5 depicts example calculations of FEXT among signal pins 1 and 2, pins 1 and 4, pins 1 and 3, pins 2 and 3, pins 2 and 4, and pins 3 and 4. Pin shape and orientation of vertical mounts adjacent to one another can reduce the socket FEXT, which can improve the SNR among data transmitted on signal pins.

Figures 4, 4A, 5, 6:
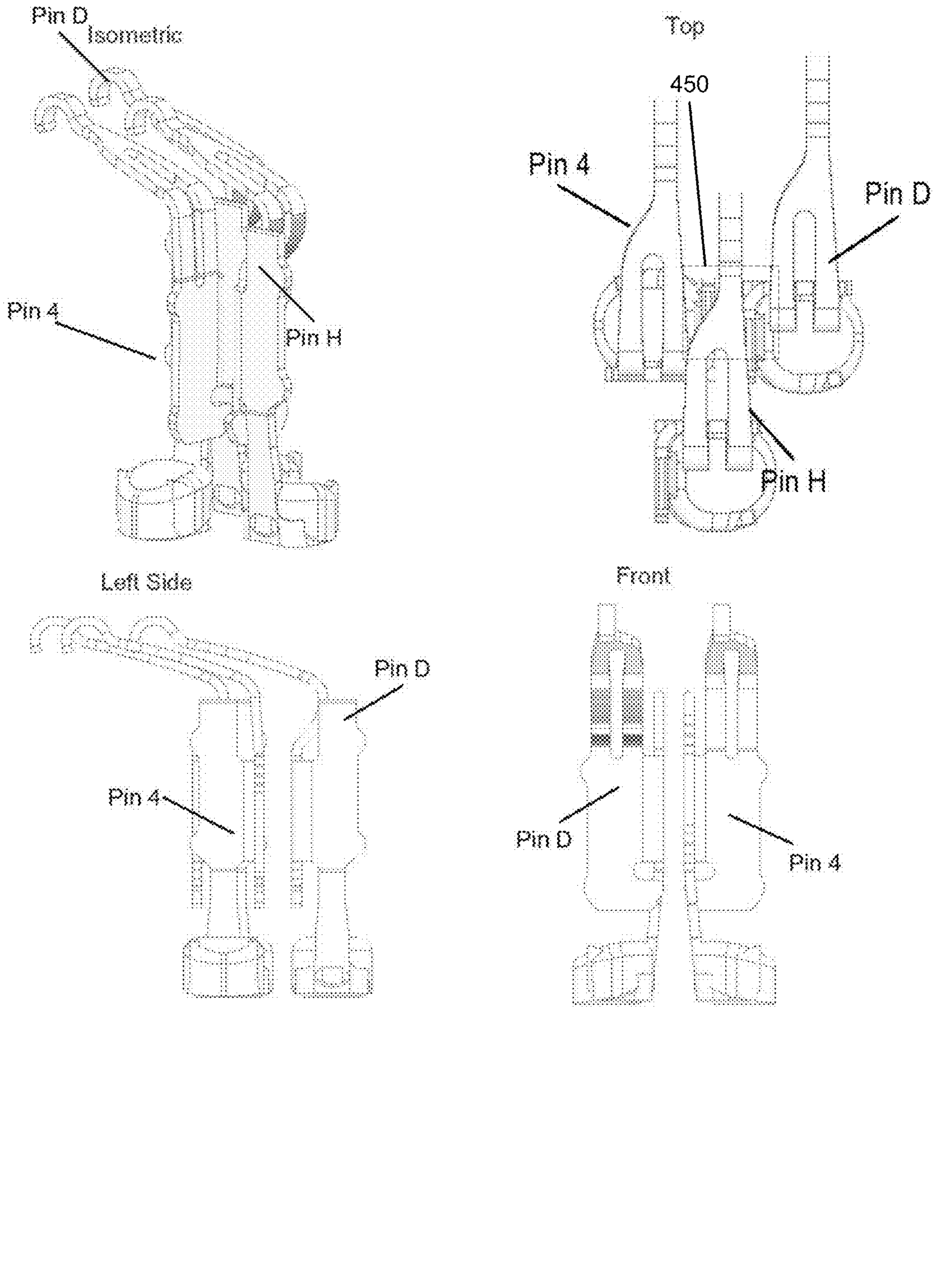
Figure 5:
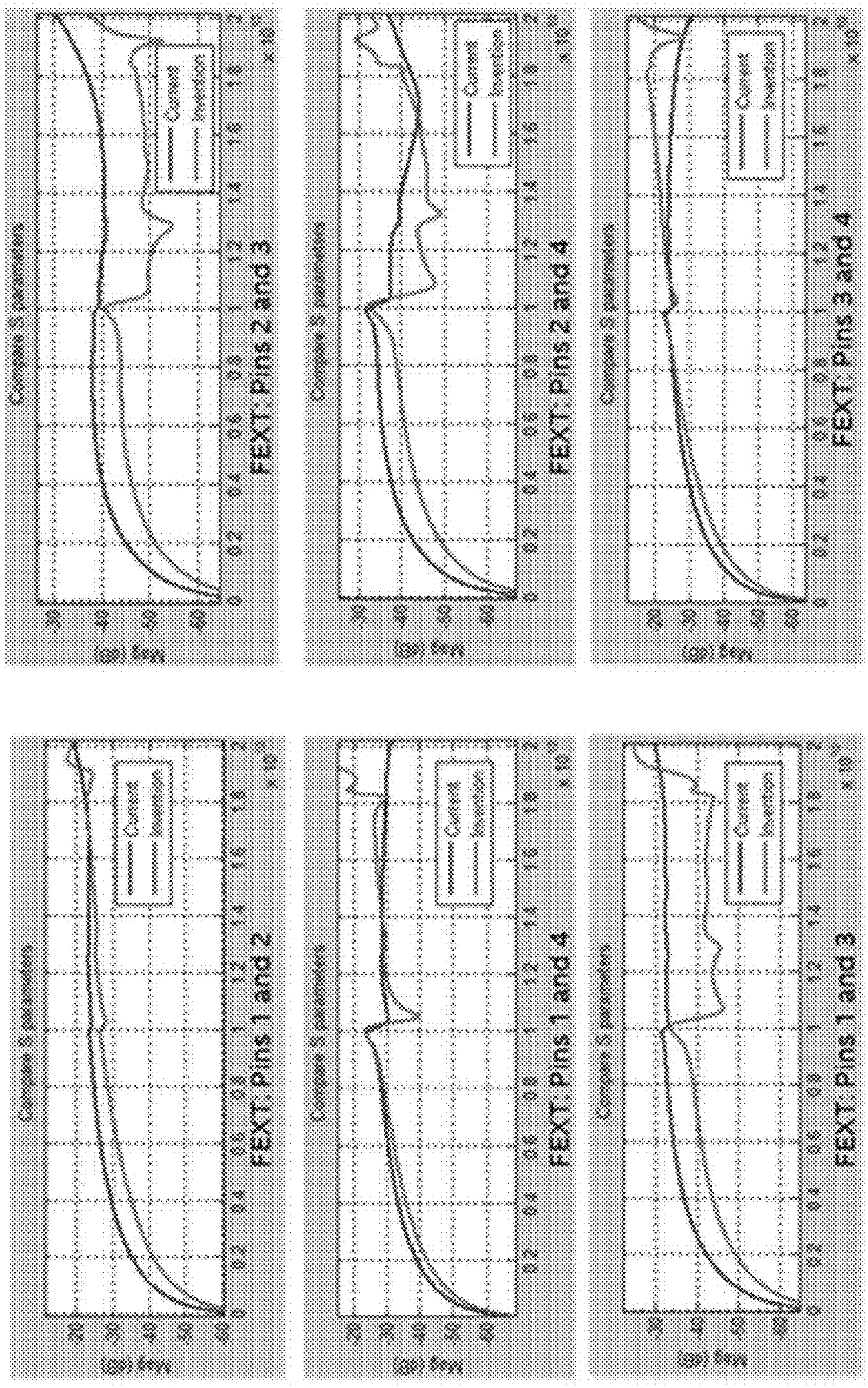
Figure 6:
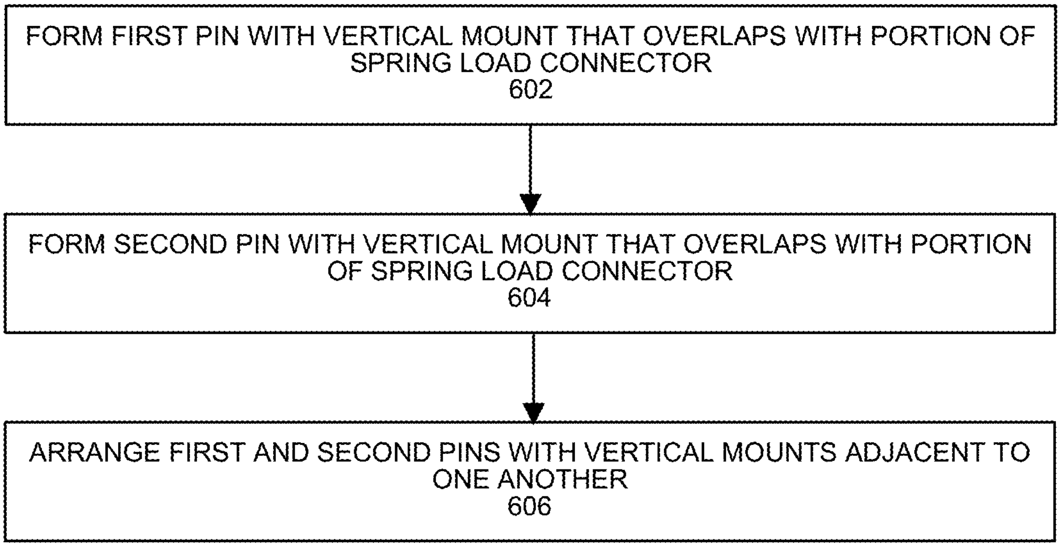

FIG. 6 depicts an example process that can be used to form connections between first and second devices. At 602, a first pin can be formed with a vertical mount that overlaps a portion of a spring load connector. The first pin can be used as a signal pin or a ground pin. At 604, a second pin can be formed with a vertical mount that overlaps a portion of a spring load connector. The second pin can be used as a ground pin if the first pin is a signal pin or a signal pin if the first pin is a ground pin. At 606, the first and second pins can be arranged so that vertical mounts are adjacent to one another. For example, if the first and second pins are in a row, the vertical mounts of the first and second pins can be adjacent to one another. The process can be repeated for other arrangements of adjacent signal and ground pins. The arrangement of pins can be consistent with a bowtie pattern. A pin can be used to connect a motherboard solder mount pad to a CPU package landing pad.

Figure 7:
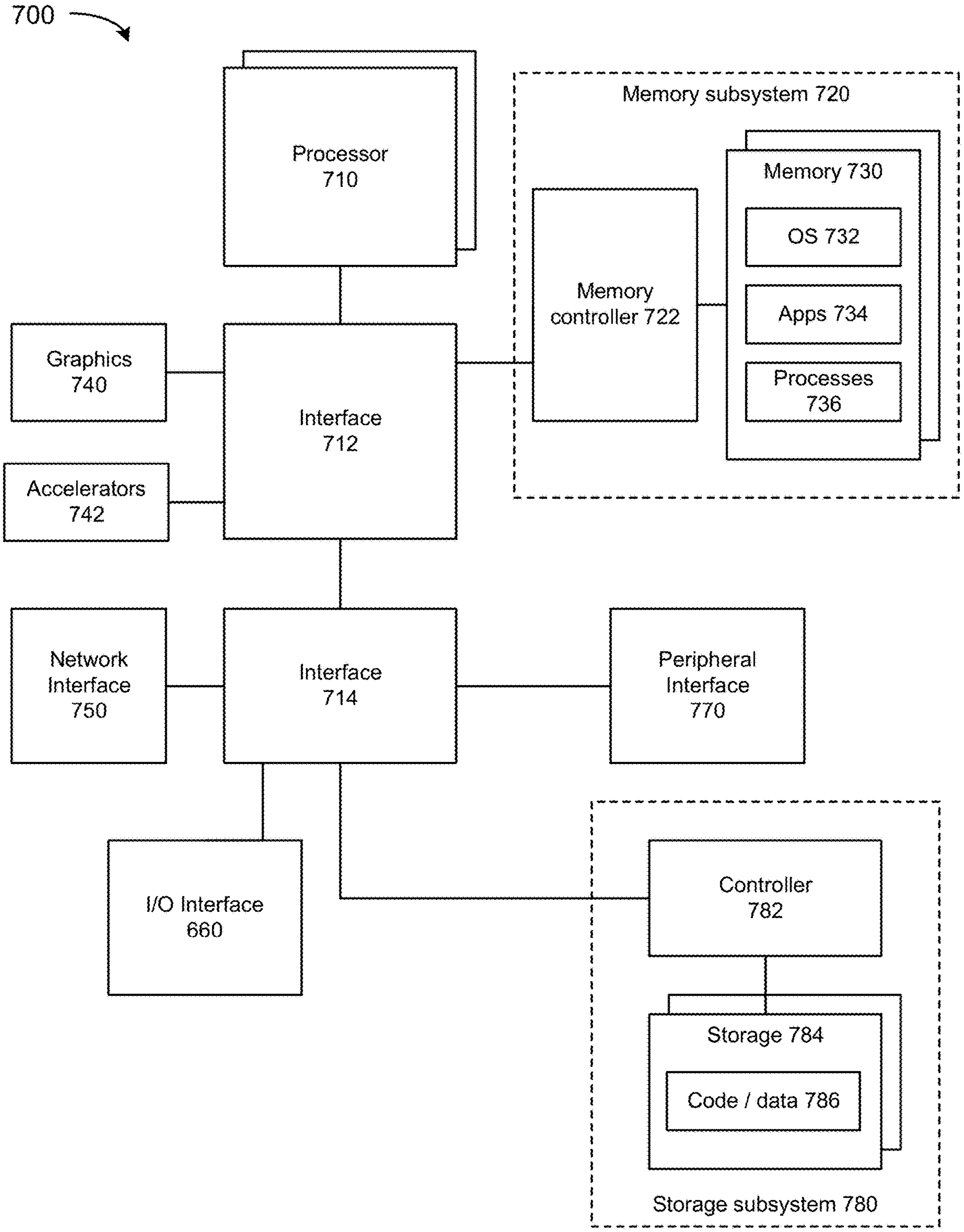
FIG. 7 depicts a system.

FIG. 7 depicts a system. The system can use embodiments described herein to provide ground pin connections to connect devices. System 700 includes processor 710, which provides processing, operation management, and execution of instructions for system 700. Processor 710 can include any type of microprocessor, central processing unit (CPU), graphics processing unit (GPU), XPU, processing core, or other processing hardware to provide processing for system 700, or a combination of processors. An XPU can include one or more of: a CPU, a graphics processing unit (GPU), general purpose GPU (GPGPU), and/or other processing units (e.g., accelerators or programmable or fixed function FPGAs). Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a programmable or fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007), DDR4 (DDR version 4, initial specification published in September 2012 by JEDEC), DDR4E (DDR version 4), DDR5, LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, DDR5, or others or combinations of memory technologies, and technologies based on derivatives or extensions of such specifications. The JEDEC standards are available at www.jedec.org.

Various embodiments of a signal pin and ground pin described herein can be used in connections of motherboard solder mount pads to a CPU package landing pads, or others or combinations of memory technologies, and technologies based on derivatives or extensions of such specifications.

A non-volatile memory (NVM) device is a memory whose state is determinate even if power is interrupted to the device. In some embodiments, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes one or more examples, and includes an apparatus comprising: a first signal pin and a first ground pin adjacent to the first signal pin, wherein: the first signal pin comprises a first portion, a second portion, and a third portion, the first ground pin comprises a first portion, a second portion, and a third portion, the second portion of the first signal pin comprises a vertical mount, the second portion of the first ground pin comprises a vertical mount, and the second portion of the first signal pin and the second portion of the first ground pin are arranged proximate one another.

Example 2 includes one or more examples, wherein the first portion of the first ground pin is coupled to a ball grid array (BGA) solder mount pad of a motherboard.

Example 3 includes one or more examples, wherein the third portion of the first ground pin is coupled to a landing pad of a processor package.

Example 4 includes one or more examples, wherein the second portion of the first ground pin is to provide stability and rigidity for the first ground pin.

Example 5 includes one or more examples, wherein the second portion of the first ground pin and the second portion of the first signal pin are adjacent to one another and the first ground pin and the first signal pin are arranged in a line.

Example 6 includes one or more examples, wherein the second portion of the first ground pin and the second portion of the first signal pin comprise one or more of: copper, bronze, or an alloy.

Example 7 includes one or more examples, and includes a second signal pin and a second ground pin adjacent to the second signal pin, wherein the second signal pin comprises a first portion, a second portion, and a third portion, the second ground pin comprises a first portion, a second portion, and a third portion, the second portion of the second signal pin comprises a vertical mount, the second portion of the second ground pin comprises a vertical mount, and the second portion of the second signal pin and the second portion of the second ground pin are arranged proximate one another.

Example 8 includes one or more examples, and includes a first device and a second device, wherein the first device comprises a motherboard and at least one solder mount pad for a ball grid array (BGA) coupled to the motherboard, the first portion of the first ground pin is coupled to the at least one solder mount pad, the second device comprises at least one processor package and at least one processor package landing pad coupled to the at least one processor package, and the third portion of the second ground pin is coupled to the at least one processor package landing pad.

Example 9 includes one or more examples, wherein the at least one processor package comprises one or more of: central processing unit (CPU), XPU, and/or graphics processing unit (GPU).

Example 10 includes one or more examples, and includes a method comprising: transmitting a first signal through a first signal pin from a first device to a second device, wherein the first signal pin is positioned proximate to a first ground pin; transmitting second signal through a second signal pin from the first device to the second device, wherein the second signal pin is positioned proximate to a second ground pin; and providing reduction of far end cross talk between the first and second signal pins using an arrangement of vertical mounts in the first signal pin and the first ground pin.

Example 11 includes one or more examples, wherein the first signal pin is coupled to a surface mount pad on a motherboard package landing pad and coupled to a processor package landing pad and the second signal pin is coupled to a second surface mount pad on a second motherboard package landing pad and coupled to a second processor package landing pad.

Example 12 includes one or more examples, wherein the first device comprises a motherboard and the second device comprises a processor package.

Example 13 includes one or more examples, wherein the processor package includes one or more of: a central processing unit (CPU), XPU, and/or graphics processing unit (GPU).

Example 14 includes one or more examples, and includes a system comprising: a first device comprising a motherboard; a second device comprising a processor package; and an arrangement of a pair of a signal pin and a ground pin coupled to the motherboard and processor package, wherein vertical mount portions of the signal pin and ground pin pair are proximate each other.

Example 15 includes one or more examples, wherein the signal pin and the ground pin comprise one or more of: copper, bronze, or an alloy.

Example 16 includes one or more examples, wherein: the signal pin comprises a first portion, a second portion, and a third portion, the ground pin comprises a first portion, a second portion, and a third portion, the second portion of the signal pin comprises a first vertical mount, the second portion of the ground pin comprises a second vertical mount, and the second portion of the signal pin and the second portion of the ground pin are arranged proximate one another.

Example 17 includes one or more examples, and includes a second signal pin and a second ground pin adjacent to the second signal pin, wherein: the second signal pin comprises a first portion, a second portion, and a third portion, the second ground pin comprises a first portion, a second portion, and a third portion, the second portion of the second signal pin comprises a vertical mount, the second portion of the second ground pin comprises a vertical mount, and the second portion of the second signal pin and the second portion of the second ground pin are arranged proximate one another.

Example 18 includes one or more examples, and includes a processor, wherein the signal pin and ground pin pair couple the processor package to the motherboard.

Example 19 includes one or more examples, wherein the processor comprises one or more of: a central processing unit (CPU), XPU, accelerator, and/or graphics processing unit (GPU).

Example 20 includes one or more examples, and includes a memory device coupled to the processor package via the motherboard.

What is claimed is:

1. An apparatus comprising:

a first signal pin and a first ground pin adjacent to the first signal pin, wherein:

the first signal pin comprises a first portion, a second portion, and a third portion, the first ground pin comprises a first portion, a second portion, and a third portion, the second portion of the first signal pin comprises a vertical mount and a cantilever mount segment, the second portion of the first ground pin comprises a vertical mount and a cantilever mount segment, the cantilever mount segment of the first signal pin and the cantilever mount segment of the first ground pin are arranged proximate, adjacent, and mirror one another, the first portion of the first signal pin comprises a soldering portion, and the third portion of the first signal pin comprises spring load.

2. The apparatus of claim 1, wherein the first portion of the first ground pin is coupled to a ball grid array (BGA) solder mount pad of a motherboard.

3. The apparatus of claim 1, wherein the third portion of the first ground pin is coupled to a landing pad of a processor package.

4. The apparatus of claim 1, wherein the second portion of the first ground pin is to provide stability and rigidity for the first ground pin.

5. The apparatus of claim 1, wherein the second portion of the first ground pin and the second portion of the first signal pin are adjacent to one another and the first ground pin and the first signal pin are arranged in a line.

6. The apparatus of claim 1, wherein the second portion of the first ground pin and the second portion of the first signal pin comprise one or more of: copper, bronze, or an alloy.

7. The apparatus of claim 1, comprising:

a second signal pin and a second ground pin adjacent to the second signal pin, wherein:

the second signal pin comprises a first portion, a second portion, and a third portion, the second ground pin comprises a first portion, a second portion, and a third portion, the second portion of the second signal pin comprises a vertical mount, the second portion of the second ground pin comprises a vertical mount, and the second portion of the second signal pin and the second portion of the second ground pin are arranged proximate one another.

8. The apparatus of claim 7, further comprising a first device and a second device, wherein the first device comprises a motherboard and at least one solder mount pad for a ball grid array (BGA) coupled to the motherboard, the first portion of the first ground pin is coupled to the at least one solder mount pad, the second device comprises at least one processor package and at least one processor package landing pad coupled to the at least one processor package, and the third portion of the second ground pin is coupled to the at least one processor package landing pad.

9. The apparatus of claim 8, wherein the at least one processor package comprises one or more of: central processing unit (CPU), XPU, and/or graphics processing unit (GPU).

10. A system comprising:

a first device comprising a motherboard;

a second device comprising a processor package; and an arrangement of a pair of a signal pin and a ground pin coupled to the motherboard and the processor package, wherein:

the signal pin comprises a first portion, a second portion, and a third portion, the ground pin comprises a first portion, a second portion, and a third portion, the second portion of the signal pin comprises a vertical mount and a cantilever mount segment, the second portion of the ground pin comprises a vertical mount and a cantilever mount segment, the cantilever mount segment of the signal pin and the cantilever mount segment of the ground pin are arranged proximate, adjacent, and mirror one another, the first portion of the signal pin comprises a soldering portion, and the third portion of the signal pin comprises spring load.

11. The system of claim 10, wherein the signal pin and the ground pin comprise one or more of: copper, bronze, or an alloy.

12. The system of claim 10, wherein:

the signal pin comprises a first portion, a second portion, and a third portion, the ground pin comprises a first portion, a second portion, and a third portion, the second portion of the signal pin comprises a first vertical mount, the second portion of the ground pin comprises a second vertical mount, and the second portion of the signal pin and the second portion of the ground pin are arranged proximate one another.

13. The system of claim 10, comprising:

a second signal pin and a second ground pin adjacent to the second signal pin, wherein:

the second signal pin comprises a first portion, a second portion, and a third portion, the second ground pin comprises a first portion, a second portion, and a third portion, the second portion of the second signal pin comprises a vertical mount, the second portion of the second ground pin comprises a vertical mount, and the second portion of the second signal pin and the second portion of the second ground pin are arranged proximate one another.

14. The system of claim 10, comprising a processor, wherein the signal pin and ground pin pair couple the processor package to the motherboard.

15. The system of claim 14, wherein the processor comprises one or more of: a central processing unit (CPU), XPU, accelerator, and/or graphics processing unit (GPU).

16. The system of claim 10, comprising a memory device coupled to the processor package via the motherboard.

17. The apparatus of claim 1, wherein the vertical mount of the first signal pin and the vertical mount of the first ground pin are facing opposite directions.

* * * * *